(12) United States Patent
Dunbar et al.

(10) Patent No.: US 7,599,295 B2
(45) Date of Patent: Oct. 6, 2009

(54) SYSTEM FOR PASSIVE ALARM PROPAGATION AND SUPPRESSION FOR PACKET BASED NETWORKS

(75) Inventors: Linda Dunbar, Plano, TX (US); Robert Sultan, Somers, NY (US)

(73) Assignee: Futurewei Technologies, Inc., Plano, TX (US)

( * ) Notice: Subject to any disclaimer, the term of this patent is extended or adjusted under 35 U.S.C. 154(b) by 490 days.

(21) Appl. No.: 11/532,951

(22) Filed: Sep. 19, 2006

(65) Prior Publication Data

US 2007/0064674 A1 Mar. 22, 2007

Related U.S. Application Data

(60) Provisional application No. 60/718,818, filed on Sep. 20, 2005.

(51) Int. Cl.
*H04L 12/28* (2006.01)
*G06F 15/173* (2006.01)
(52) U.S. Cl. .................................. 370/235; 709/223
(58) Field of Classification Search ................ None
See application file for complete search history.

(56) References Cited

U.S. PATENT DOCUMENTS

| | | | |
|---|---|---|---|
| 6,392,989 B1 | 5/2002 | Jardetzky et al. | |
| 6,647,412 B1 * | 11/2003 | Strandberg et al. | 709/223 |
| 2003/0016678 A1 * | 1/2003 | Maeno | 370/400 |
| 2004/0160895 A1 * | 8/2004 | Holmgren et al. | 370/223 |
| 2008/0092228 A1 * | 4/2008 | Baum | 726/13 |

FOREIGN PATENT DOCUMENTS

| | | |
|---|---|---|
| EP | 1443716 A1 | 8/2004 |
| WO | 2005011206 A1 | 2/2005 |

OTHER PUBLICATIONS

Foreign Communication From a Related Counterpart Application—International Search Report and Written Opinion, PCT/CN2006/002464, Jan. 25, 2007, 7 pages.
IEEE Standard, 802.1ag/D4.1, "Draft Standard for Local and Metropolitan Area Networks—Virtual Bridged Local Area Networks—Amendment 5: Connectivity Fault Management," IEEE Computer Society, Aug. 18, 2005, 188 pages.

* cited by examiner

*Primary Examiner*—Ricky Ngo
*Assistant Examiner*—Clemence Han
(74) *Attorney, Agent, or Firm*—Conley Rose, P.C.; Grant Rodolph

(57) ABSTRACT

A system for passive alarm propagation and suppression in a communication network is disclosed. The system includes a packet based network including one subset of network providing connectivity to other set(s) of network. The network includes a first edge node and a second edge node; a first customer node connecting to the first edge node and a second customer node connecting to the second edge node; and a replicated alarm suppression table (RAST) residing in the first provider edge node.

26 Claims, 4 Drawing Sheets

SYSTEM FOR PASSIVE ALARM PROPAGATION AND SUPPRESSION FOR PACKET BASED NETWORKS

FIELD OF INVENTION

The present invention generally relates to packet based networks, and more specifically, relates to passive alarm propagation and suppression in packet based networks.

BACKGROUND OF THE INVENTION

An Alarm Indication Signal (AIS) is a signal transmitted in lieu of a normal signal to maintain transmission continuity, and indicate to a receiving terminal that there is a fault located somewhere along the transmission path, which could be source node, intermediate nodes, or any links along the path. An AIS has been used by Transport networks to indicate upstream alarms. When downstream nodes receive alarms from their upstream nodes, they can suppress secondary alarms which are caused by the upstream faults.

AIS alarm propagation has been used in conventional transport networks for a long time. However, such approaches are not effective in a packet based network for propagating faults, especially in a connection-less oriented packet network, where each node can be connected to its peers via multiple connections. Such propagation used by circuit networks can flood a packet network if there are many upstream faults.

IEEE802.1ag/D4.1 has proposed another form of AIS for provider edge nodes. This form multicasts an AIS signal to an entire administration domain, so that bridges can suppress alarms of losing its connectivity to their peers. However, there are issues with the proposed methods. IEEE802.1ag/D4.1 provides two possible ways to send AIS to affected nodes. A first method is to let a provider edge node send periodic AIS message to all the nodes in an administration domain. This method can introduce too many messages, flooding an administrative domain. The excessive messages can cause congestion and unnecessary traffic within the administration domain. A second method only sends one AIS message when a provider edge detects failure. Subsequently, an AIS "clear" message is sent when the provider node recovers from connectivity failure. In this case, even though the number of AIS messages in the administrative domain may be reduced, the AIS "clear" message may not be sent to newly added bridges when the provider node recovers from its connectivity failure, or nodes being created after the failure occur may not get a failure message.

Therefore, there is a need for a system that effectively enables fault propagation and achieve alarm suppression, in a multipoint packet based network.

SUMMARY OF THE INVENTION

The present invention discloses a versatile system, in a packet based network, that determines whether an AIS message is to be propagated or suppressed to a customer node.

The present invention provides a Replicated Alarm Suppression Table (RAST), dynamically set up in a provider edge node of a packet based provider network. When a customer node detects a connectivity failure with its peers, the customer node may check the RAST to determine whether the failure is caused by the provider domain supporting the customer node to, in turn, determine whether an alarm report is to be suppressed or not, and to determine the actual cause of the connectivity failure.

In one embodiment, a customer node notifies a provider edge node, and the provider edge node then checks the RAST to determine cause of the failure. If the failure is caused by a failed connectivity between its supporting provider edge nodes, then the customer node may suppress the customer node's secondary alarm report. If no failure is detected on the connectivity between its supporting provider edge nodes, then the customer node may report the connectivity fault to its peers indicating the connectivity fault is caused by its own administration domain.

In another embodiment, a primary connection failure of a provider edge node may not necessarily affect a connectivity of a customer node to its peers. When multiple paths across a provider domain exist, a secondary connection may be found to overcome the primary connection failure. Thus there is no need for the provider edge to propagate its failure to its customer node.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

The present invention is hereafter in relation to certain exemplary embodiments below. It is understood, however, that the embodiments below are not necessarily limitations to the present disclosure. Although only a few exemplary embodiments of this invention have been described in detail, those skilled in the art will readily appreciate that many modifications are possible in the exemplary embodiments. It is understood that modifications, changes and substitutions are intended in the foregoing disclosure, and in some instances some features of the invention will be employed without a corresponding use of other features.

Figure 1:
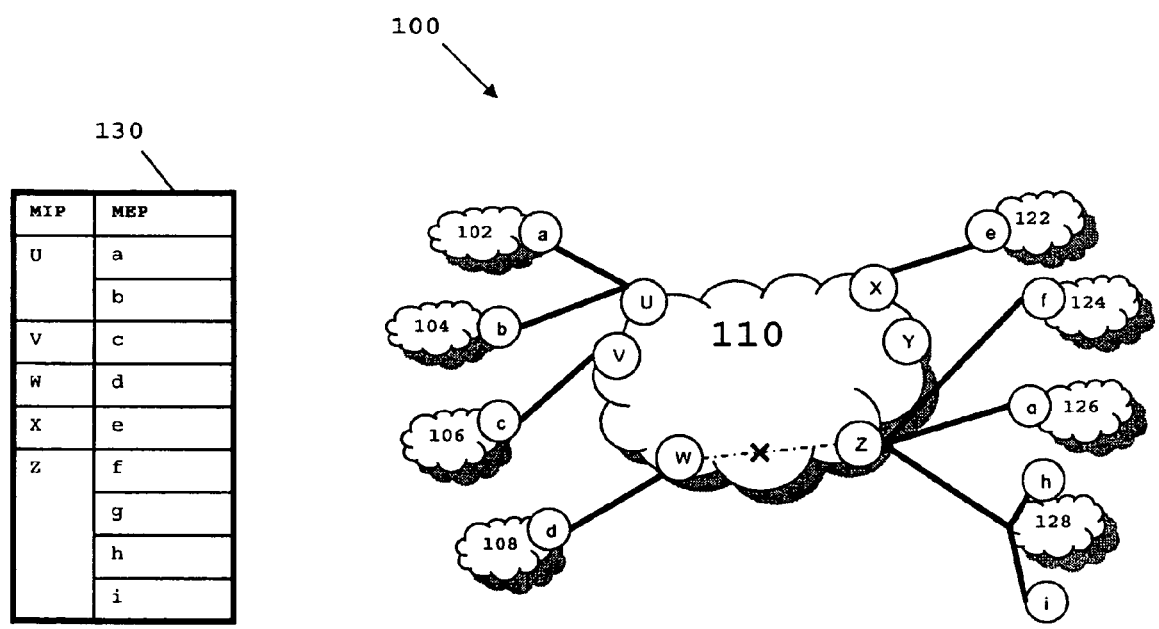
FIG. 1 depicts one embodiment of a replicated alarm suppression table corresponding to a packet based network, according to the present invention.

Referring to FIG. 1, a replicated alarm suppression table (130) corresponding to a packet based network (100) according to the present invention is depicted. Network (100) includes a provider network (110) and a plurality of customer sites, including Site (102), Site (104), Site (106), Site (108), Site (122), Site (124), Site (126), and Site (128). Provider network (110) includes a plurality of provider edge nodes, including Edge Node U, Edge Node V, Edge Node W, Edge Node X, Edge Node Y, and Edge Node Z, and a plurality of provider network internal nodes which are not shown in FIG. 1. Each customer site may include at least one customer node.

A person of the ordinary skill in the art will understand some terms in the present invention may be interpreted as follows: a domain which provides connectivity to other domains may be called a "Provider Network"; a "Provider Network" may or may not be a network by service providers; a simple provider network may be a physical link connecting two domains, or set of nodes; an edge node of a "Provider Network" may be called a provider edge node; a domain which gets part of its connectivity from another domain may be called a "Customer Network"; and nodes within the "Customer Network" may be called customer nodes.

As illustrated in FIG. 1, Site (102) includes Customer Node a, Site (104) includes Customer Node b, Site (106) includes Customer Node c, Site (108) includes Customer Node d, Site (122) includes Customer Node e, Site (124) includes Customer Node f, Site (126) includes Customer Node g, and Site (128) includes Customer Node h and Customer Node i. Provider network (110) connects to each customer site through connections between each provider edge node and each customer node. FIG. 1 illustrates primary connections between each provider edge node and each customer node. Edge Node U connects to Customer Node a and Customer Node b, Edge Node V connects to Customer Node c, Edge Node W connects to Customer Node d, Edge Node X connects to Customer Node e, and Edge Node Z connects to Customer Node f, Customer Node g, Customer Node h, and Customer i.

In order for a provider edge node to determine whether a provider connectivity fault is a cause of a particular customer connectivity failure, the provider edge node may need to have a table to keep track of supporting customers from other edge nodes. FIG. 1 depicts a replicated alarm suppression table (RAST) (130). Table (130) corresponds to connectivity between each provider edge node and each customer node in Network (100). In Table (130), a column correlates Maintenance Domain Intermediate Point (MIP) according to IEEE802.1ag, including Edge Node U, Edge Node V, Edge Node W, Edge Node X, Edge Node Y, and Edge Node Z. Another column correlates Maintenance Association End Point (MEP) according to IEEE802.1ag, including Customer Node a, Customer Node b, Customer Node c, Customer Node d, Customer Node e, Customer Node f, Customer Node g, Customer Node h, and Customer Node i. As Table (130) illustrates, each MIP corresponds to each MEP according to primary connectivity between each provider edge node and each customer node in Network (100), that is, Edge Node U at MIP associates with Customer Node a and Customer Node b at MEP, Edge Node V at MIP associates with Customer Node c, Edge Node W at MIP associates with Customer Node d, Edge Node X at MIP associates with Customer Node e, and Edge Node Z at MIP associates with Customer Node f, Customer Node g, Customer Node h, and Customer Node i at MEP.

In one embodiment, Table (130) may be established by each customer site registering to a provider edge node of nodes belonging to this customer site. Each edge node sends its own RAST to all other edge nodes in Network (100). Table (130) is dynamically set up correlating to each MIP/MEP, with a registration process by insertion or deletion of a connection between a provider edge node (e.g. Edge Node W) and a customer node (e.g. Customer Node d).

As illustrated in FIG. 1, when connectivity between Edge Node W and Edge Node Z fails, using Table (130), Edge Node W may recognize that its connectivity loss to Edge Node Z is the cause of Customer Node d's connectivity loss to Node f/g/h/i. Furthermore, using Table (130), Customer Node d may obtain knowledge that Edge Node Z connects to Customer Node f, Customer Node g, Customer Node h, and Customer Node i. Then Customer Node d may not report secondary connection failures to the NMS. These secondary connection failures include connections between Customer Node d and Customer Node f, Customer Node d and Customer Node g, Customer Node d and Customer Node h, and Customer Node d and Customer Node i. This process suppresses an alarm report avoiding possible alarm signal flooding in Network (100).

Figure 2:
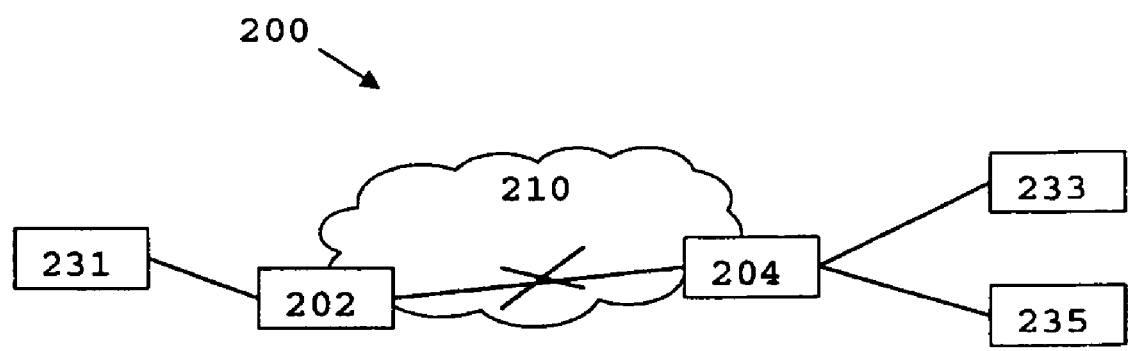
FIG. 2 depicts one embodiment of a simplified packet based network that provides communication between edge nodes and customer nodes according to the present invention.

Referring to FIG. 2, a simplified packet based provider network (200) that provides communication between provider edge nodes and customer nodes is illustrated. Customer node (231) represents one of the customer nodes on one side of Provider Network (210). Customer node (233) and Customer node (235) represent two customer nodes on the opposite side of Provider Network (210). Provide Edge Node (202) is connected to Customer node (231), and Provider Edge Node (204) is connected to Customer node (233) and Customer node (235). In addition, Provider Edge Node (202) is connected to Provider Edge Node (204). When connectivity between Provider Edge Node (202) and Provider Edge Node (204) fails, Customer node (231) may lose connectivity to both Customer node (233) and Customer node (235).

Figure 3:
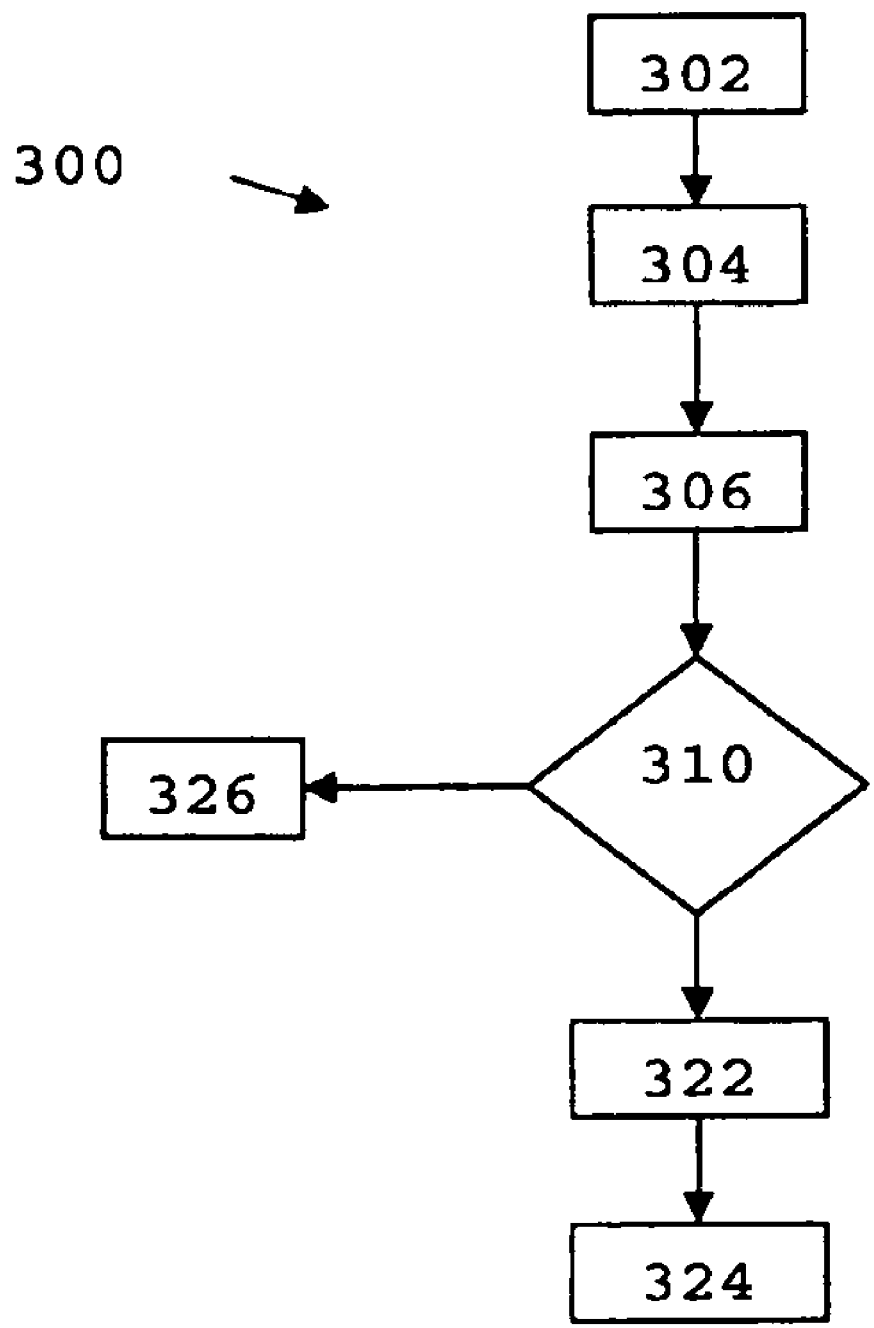
FIG. 3 is flow diagram illustrating passive alarm propagation and suppression for a packet based network according to the present invention.

Referring now to FIG. 3, a flow diagram illustrates a process of passive alarm propagation and suppression for a packet based network (300) according to the present invention. In connection with FIG. 2, the process starts when Customer node (231) loses connectivity with Customer node (235) at (302). In step (304), Customer node (231) inquires Provider Edge Node (202). When Network (300) receives such inquiry, a RAST in Provider Edge Node (202) is checked (306). A determination (310) is made as to whether a failed connectivity is caused by the connectivity loss between Provider Edge Node (202) and Provider Edge Node (204). If Determination (310) result indicates no failure occurred between Provider Edge Node (202) and Provider Edge Node (204), then Provider Edge Node (202) indicates provider network free of failure to Customer Node (231), which is associated with Provider Edge Node (202), at Step (326). If Determination (310) result indicates a connectivity failure occurred between Provider Edge Node (202) and Provider Edge Node (204) is the cause of connectivity loss between Customer Node (231) and (233)/(235), then Provider Edge Node (202) notifies Customer Node (231) at Step (322), and Customer Node (231) may suppress a secondary alarm report (324) on losing connectivity to, in this case, Customer Node (233).

Figure 4:
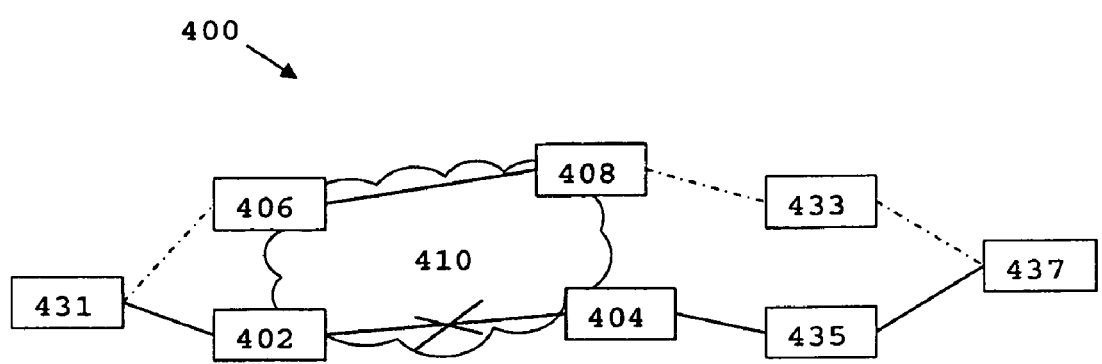
FIG. 4 depicts one embodiment of a simplified packet based network in which an alternative path across a provider domain for connections between customer sites according to the present invention.

Referring to FIG. 4, a simplified packet based network (400) in which an alternative path across a provider network (410) for connections between customer sites is illustrated. In FIG. 4, Customer Node (431) represents one of the customer nodes on one side of Network (410). Customer Node (433), Customer Node (435), and Customer Node (437), represent customer nodes on the opposite side of Network (410). Customer Node (437) connects to both Customer Node (433) and Customer Node (435).

Also illustrated in FIG. 4, Provider Edge Node (402), Provider Edge Node (404), Provider Edge Node (406), and Provider Edge Node (408) represent four provider edge nodes within Network (410), wherein Provider Edge Node (402) is connected to Provider Edge Node (404), and Provider Edge Node (406) is connected to Provider Edge Node (408). In addition, Customer Node (431) is connected to both Provider Edge Node (402) and Provider Edge Node (406). Customer Node (433) is connected to Provider Edge Node (408), and Customer Node (435) is connected to Provider Edge Node (404).

When connectivity fails between Customer Node (431) and Customer Node (435) due to failed connectivity between Provider Edge Node (402) and Provider Edge Node (404), Customer Node (431) may lose a primary connection route to Customer Node (435) via connection between Provider Edge Node (402) and Provider Edge Node (404). However, Customer Node (431) may connect to Customer Node (435) via an alternative route.

As illustrated in FIG. 4, the alternative route of connection between Customer Node (431) and Customer Node (435) may be through a route from Customer Node (431) to Provider Edge Node (406), to Provider Edge Node (408), to Customer Node (433), to Customer Node (437), and to Customer Node (435). In this case, Customer Node (431) may not need to report an alarm to NMS associated with Customer Node (431), thereby reducing alarm report overhead in Network (400).

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system for passive alarm propagation and suppression in a communication network, comprising:
   a packet-based network, having a first set of domains providing connectivity to a second set of domains, and a plurality of edge nodes;
   a plurality of customer nodes, wherein each of the plurality of customer nodes connects to at least one of the plurality of edge nodes; and
   a table correlating a plurality of connections between each of the plurality of customer nodes and at least one of the plurality of edge nodes;
   wherein the plurality of edge nodes comprises:
   a first edge node connecting to a first customer node; and
   a second edge node connecting to a second customer node;
   wherein the first edge node checks the table to determine the connection between the first edge node and the second edge node when the first customer node sends a message to the first edge node indicating a connection failure between the first customer node and the second customer node.

2. The system of claim 1, wherein the packet-based network comprises a packet-based provider network.

3. The system claim 1, wherein if the first edge node determines the connection failure is a result of a connectivity failure between the first set of domains and the second set of domains, then the first edge node indicates to the first customer node that the connectivity failure occurs between the first set of domains and the second set of domains.

4. The system claim 1, wherein if the first edge node determines the connection between the first edge node and the second edge node is not a result of a connectivity failure between the first set of domains and the second set of domains, then the first edge node notifies the first customer node, and the first customer node, in turn, reports an alarm to a management system connecting to the first customer node that the connectivity failure does not occur between the first set of domains and the second set of domains.

5. The system of claim 1, wherein the table resides on each of the plurality of edge nodes.

6. The system of claim 1, wherein the table comprises:
   a first column comprising a plurality of Maintenance Domain Intermediate Points (MIPs);
   a second column comprising a plurality of Maintenance Association End Points (MEPs); and
   a connection relation between each of the plurality of MIPs and each of the plurality of MEPs.

7. The system of claim 6, wherein the table is dynamically set up using a client registration of insertion or deletion of each of the plurality of customer nodes to at least one of the plurality of edge nodes.

8. The system of claim 6, wherein the table identifies whether each of the plurality of customer nodes is connected to at least one of the plurality of edge nodes.

9. The system of claim 1 wherein the first edge node and the second edge node each comprise an IEEE 802.1ag maintenance domain intermediate point and the customer nodes each comprise an IEEE 802.1ag maintenance association end point.

10. A method of passive alarm propagation and suppression in a communication network, comprising the steps of:
    providing a packet-based network, having a first set of domains providing connectivity to a second set of domains, and a plurality of edge nodes;
    providing a plurality of customer nodes, wherein each of the plurality of customer nodes connects to at least one of the plurality of edge nodes; and
    providing a table correlating a plurality of connections between each of the plurality of customer nodes and at least one of the plurality of edge nodes;
    wherein the plurality of edge nodes comprises:
    a first edge node connecting to a first customer node; and
    a second edge node connecting to a second customer node;
    wherein the first edge node checks the table to determine the connection between the first edge node and the second edge node when the first customer node sends a message to the first edge node indicating a connection failure between the first customer node and the second customer node.

11. The method of claim 10, wherein the packet-based network comprises a packet-based provider network.

12. The method of claim 10, wherein if the first edge node determines the connection failure is a result of a connectivity failure between the first set of domains and the second set of domains, then the first edge node indicates to the first customer node that the connectivity failure occurs between the first set of domains and the second set of domains.

13. The method of claim 10, wherein if the first edge node determines the connection between the first edge node and the second edge node is not a result of a connectivity failure between the first set of domains and the second set of domains, then the first edge node notifies the first customer node, and the first customer node, in turn, reports an alarm to a management system connecting to the first customer node that the connectivity failure does not occur between the first set of domains and the second set of domains.

14. The method of claim 10, wherein the table resides on each of the plurality of edge nodes.

15. The method of claim 10, wherein the table comprises:
    a first column comprising a plurality of Maintenance Domain Intermediate Points (MIPs);
    a second column comprising a plurality of Maintenance Association End Points (MEPs); and
    a connection relation between each of the plurality of MIPs and each of the plurality of MEPs.

16. The method of claim 15, wherein the table is dynamically set up using a client registration of insertion or deletion of each of the plurality of customer nodes to one of the plurality of edge nodes.

17. The method of claim 15, wherein the table identifies whether each of the plurality of customer nodes is connected to at least one of the plurality of edge nodes.

18. The method of claim 10 wherein the first edge node and the second edge node each comprise an IEEE 802.1ag maintenance domain intermediate point and the customer nodes each comprise an IEEE 802.1ag maintenance association end point.

19. A method of passive alarm propagation and suppression in a communication network, comprising the steps of:
providing a packet-based provider network, having a first provider edge node and a second provider edge node;
providing a first customer node connecting to the first provider edge node and a first set of peer customer nodes, and a second customer node connecting to the second provider edge node and a second set of peer customer nodes; and
providing a table correlating a connection between the first provider edge node and the first customer node, and a connection between the second provider edge node and the second customer node;
wherein the first provider edge node checks the table to determine a connection between the first provider edge node and the second provider edge node when the first customer node sends a message to the first provider edge node, indicating a connection failure between the first customer node and the second customer node.

20. The method of claim 19, wherein if the first provider edge node determines the connection between the first provider edge node and the second provider edge node fails and the failure affects connectivity between the first customer node and the second customer node, then the first provider edge node notifies the first customer node, and the first customer node, in turn, suppresses an alarm report to the first set of peer customer nodes of losing connectivity.

21. The method of claim 19, wherein if the first provider edge node determines the connection between the first provider edge node and the second provider edge node does not fail, then the first provider edge node notifies the first customer node, and the first customer node, in turn, reports an alarm to the first set of peer customer nodes.

22. The method of claim 19, wherein if the first provider edge node determines a failed connection between the first provider edge node and the second provider edge node does not affect connectivity between the first customer node and the second customer node, then the first provider edge node notifies the first customer node, and the first customer node, in turn, does not report an alarm to the first set of peer customer nodes.

23. The method of claim 19, wherein the table resides on the first provider edge node and the second provider edge node.

24. The method of claim 19, wherein the table comprises:
a first column comprising a plurality of Maintenance Domain Intermediate Points (MIPs);
a second column comprising a plurality of Maintenance Association End Points (MEPs); and
a connection relation between each of the plurality of MIPs and each of the plurality of MEPs.

25. The method of claim 24, wherein the table is dynamically set up using a client registration of insertion or deletion of the first customer node to the first provider edge node, and a client registration of insertion or deletion of the second customer node to the second provider edge node.

26. The method of claim 24, wherein the table identifies whether the first customer node is connected to the first provider edge node, and whether the second customer node is connected to the second provider edge node.

* * * * *

UNITED STATES PATENT AND TRADEMARK OFFICE
CERTIFICATE OF CORRECTION

PATENT NO. : 7,599,295 B2  Page 1 of 1
APPLICATION NO. : 11/532951
DATED : October 6, 2009
INVENTOR(S) : Dunbar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 507 days.

Signed and Sealed this

Twenty-eighth Day of September, 2010

David J. Kappos
*Director of the United States Patent and Trademark Office*